United States Patent [19]

De Wit

[11] Patent Number: 4,724,641
[45] Date of Patent: Feb. 16, 1988

[54] HOPPER, IN PARTICULAR A SILO

[76] Inventor: Cornelis L. De Wit, 5, Bruggerhuis, XA Leende, Netherlands

[21] Appl. No.: 870,656

[22] Filed: Jun. 2, 1986

Related U.S. Application Data

[63] Continuation of Ser. No. 729,287, May 1, 1985, abandoned.

[30] Foreign Application Priority Data

May 2, 1984 [NL] Netherlands .................... 8401400

[51] Int. Cl.$^4$ .............................. E04B 1/32; E04B 1/68
[52] U.S. Cl. ........................................ 52/249; 52/539; 52/573
[58] Field of Search ................ 52/63, 83, 192-197, 52/235, 249, 484, 539

[56] References Cited

U.S. PATENT DOCUMENTS

| Re. 3,268 | 1/1869 | Baker | 52/539 |
|---|---|---|---|
| 485,808 | 11/1892 | Curtis | 52/192 |
| 932,737 | 8/1909 | Wilson | 52/193 |
| 3,902,290 | 9/1975 | Marquet | 52/249 |
| 4,290,243 | 3/1980 | Mellin | 52/63 |
| 4,369,032 | 1/1983 | Lowrance, II et al. | 52/573 X |
| 4,453,351 | 6/1984 | Moore | 52/192 |

FOREIGN PATENT DOCUMENTS

| 961616 | 1/1975 | Canada | 52/197 |
|---|---|---|---|
| 1017360 | 10/1957 | Fed. Rep. of Germany | 52/573 |
| 2402585 | 7/1975 | Fed. Rep. of Germany | 52/235 |
| 2633607 | 2/1978 | Fed. Rep. of Germany | 220/461 |
| 8300365 | 8/1984 | Netherlands | 52/192 |

Primary Examiner—Carl D. Friedman
Assistant Examiner—Richard E. Chilcot, Jr.
Attorney, Agent, or Firm—Kramer, Brufsky & Cifelli

[57] ABSTRACT

A hopper for bulk material comprising a non-deformable skeleton supporting a deformable wall structure in such a manner through suspension members that slight movements of the wall can be taken up without scoring.

2 Claims, 3 Drawing Figures

U.S. Patent
Feb. 16, 1988
4,724,641
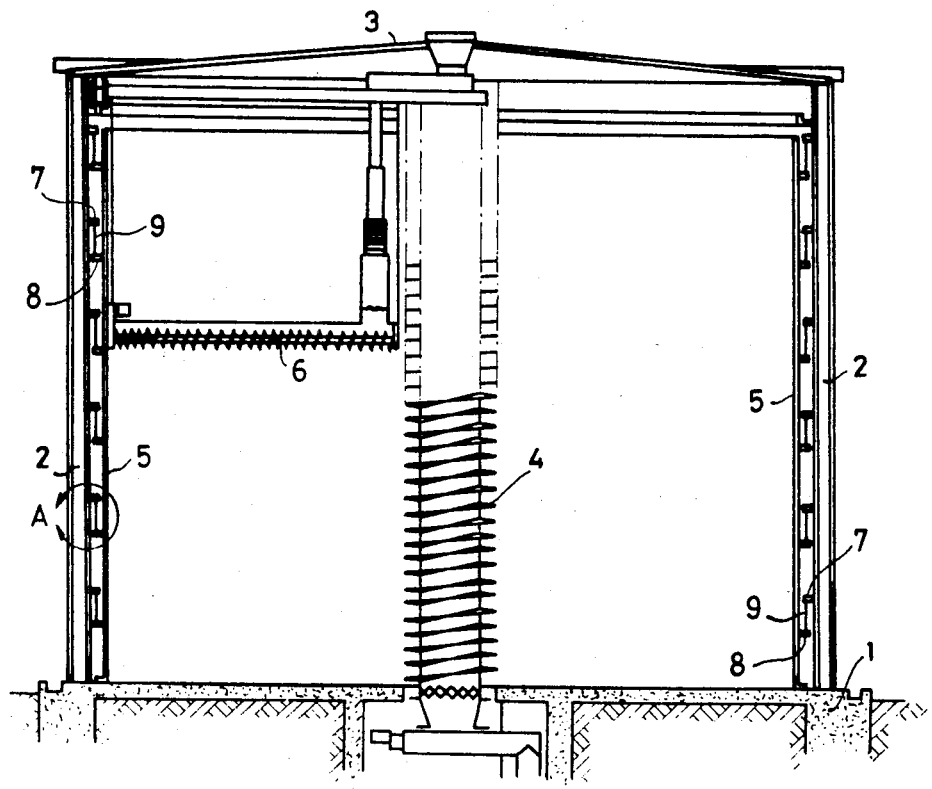
Fig. 1.
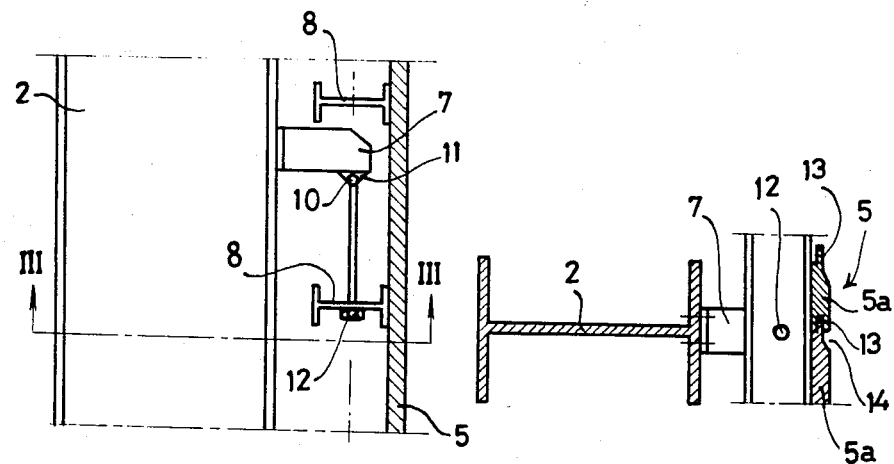
Fig. 2.
Fig. 3.

HOPPER, IN PARTICULAR A SILO

This application is a continuation of application Ser. No. 729,287, filed on May 1, 1985, now abandoned.

BACKGROUND OF THE INVENTION

The invention relates to a hopper, in particular a silo for bulk material, comprising a spatial non-deformable skeleton structure provided with carrier means for a wall which is slightly movable within the skeleton structure and which has support means cooperating with the carrier means, as disclosed in Netherlands patent specification No. 161,226.

DESCRIPTION OF THE PRIOR ART

In this known hopper, annular elements are provided with annular support means imparting a non-deformable design to the movably supported wall, said support means bearing upon the carrier means in the form of consoles provided within the skeleton structure. The annular support means are then disposed upon the consoles in a free relation. This is desirable because laterally acting forces for instance caused by solar heat may act upon the wall, in which event they could cause the wall to be deformed irregularly in the case of a fixed connection with the skeleton structure. Such deformation is especially detrimental if there is provided a rotating distribution and discharge conveyor having to operate within the space enclosed by the wall.

The known hopper has the drawback that due to the very slow movement occurring between the support means and the carrier means there occurs a scoring of the material in the contact areas. Providing lining material has not produced the results desired.

SUMMARY OF THE INVENTION

The object of the invention is to provide a hopper precluding the occurrence of scoring of the material.

Said object is attained according to the invention by a hopper of the type as described above, comprising the feature that the support means on the skeleton structure are provided with suspension members connected to the wall-supporting parts, said suspension members affording a lateral movement of the lower end thereof with respect to its upper end.

This has the advantage that there are no friction areas between the carrier means and the support means, while yet providing the possibility of movement on the inner wall. In such case, the suspension members may be chains or cables, but can also be swing rods whose ends are movably fixed to the carrier means and the support means. Preferably, the length of the operative part of the suspension members is adjustable, so that any constructional deviations can be easily offset for proper wall alignment.

In many cases, the wall consists of vertical planks which, fittingly joined together by a tongue and groove joint, are fixed to the annular support means. Such tongue and groove joints between the planks should be capable of absorbing some clearance in view of the warping of the timber and the expansion and shrinking of the annular support means as determined by the prevailing ambient temperature. This has the drawback that bulk material can frequently penetrate into the open seams of the tongue and groove joint. When then, due to the working of the timber or the shrinking of the annular support means said seams are reduced, the bulk material penetrated therein prevents such action, it is even possible that planks of the annular support means become suddenly detached.

Said drawback is eliminated with a hopper according to the present invention in that the planks are rabbet sections whose free tongue side faces the interior of the hopper.

DESCRIPTION OF THE DRAWING

FIG. 1 is a sectional view of a container in the form of a silo for bulk material, as defined by the invention;

FIG. 2 is a view, on an enlarged scale, of the detail A from FIG. 1; and

FIG. 3 is a sectional view taken on the line III—III of FIG. 2.

DESCRIPTION OF A PREFERRED EMBODIMENT

The hopper as drawn in FIG. 1 is in the form of a silo for bulk material and comprises a spatial non-deformable skeleton structure in the form of vertical columns 2 which are fixed to a foundation 1 and which may be of for instance H-shaped steel, with a roof structure 3 and a discharge arrangement 4. Within this spatial skeleton structure there is provided a movably supported wall 5. The silo has a round shape, so that the wall 5 forms a cylindrical jacket. In the space enclosed by the wall 5, there is provided a distribution and discharge conveyor 6. Said conveyor rotates in a horizontal plane about the discharge arrangement 4 in the form of a disk column and, in addition, in a vertical direction, upwards when the silo is being filled and downwards when the bulk material is to be removed from the silo. This aspect will not be further explained, as it does not form part of the subject of the invention.

It will be clear, however, that the round shape of the silo is to be maintained. To this effect, the skeleton structure is provided on the columns 2 with lateral carrier-means viz consoles 7. The wall 5 is provided with support means in the form of annular metal profiles 8. The carrier means 7 need not be in the form of consoles, but may be parts of the skeleton structure, for example in the form of horizontal annular structural beams, for instance of an angle section.

In the case of the container according to the invention, the carrier means 7 of the skeleton structure are provided with suspension members 9 connected to the support means 8 of the wall 5, said suspension members 9 affording lateral movement of its lower end relative to the upper end thereof. The suspension members 9 may then be chains or cables. Preferably, the suspension members are swing rods whose ends are fixed to the carrier means and support means, for instance in the form of a bolt whose head 10 is supported in a bracket 11 fastened to the carrier means 7. In such case, the lower part of the head may be rounded or provided with a spherical ring. The lower end of the suspension member 9 is threaded and extends through a hole in the support means 8. A nut 12 then enables adjusting the length of the operative part of the suspension member 9. It is then further possible to place rings with spherical head faces between the nut 12 and the support means 8.

It is not necessary for the suspension members 9 to be in an accurately vertical position, but the lower ends thereof could, for example, be positioned closer to the center of the container, so that they would form as it were generating lines of truncated cones. It is also possible for the lower ends of two neighboring suspension members in the same horizontal plane to be located alternatingly closer to one another or farther away from one another than the upper ends of the suspension members.

If the silo is provided with a wall composed of vertical planks, rabbet sections 5a are used, so that at the tongue and groove joint 13 there will arise no seam but a recess 14 in which it will not be possible for bulk material to adhere. The rabbet sections 5a can be fastened to the support means 8 in a known manner by using nails or bolts.

What is claimed is:

1. A hopper, in particular a silo having an interior volume for bulk material, comprising:
    a spatial non-deformable skeleton structure;
    carrier means attached to said skeleton structure;
    a wall within said skeleton structure being slightly laterally moveable towards and away from said skeleton structure in response to expansion and contraction, respectively, of the hopper interior volume;
    means for laterally supporting said wall, the supporting means cooperating with said carrier means;
    suspension members each having an upper end pivotably connected to said carrier means and each having a lower end rigidly connected to said supporting means so that pivotable movement of a suspension member about the upper pivotably connected end affords lateral movement of the lower end with respect to the upper end, the pivotable movement of each of said suspension members affording said lateral movement of said wall.

2. A hopper, in particular a silo having an interior volume for bulk material, comprising:
    a spatial non-deformable skeleton structure;
    carrier means attached to said skeleton structure;
    a wall forming a cylindrical jacket within said skeleton structure, said wall being slightly laterally moveable towards and away from said skeleton structure in response to expansion and contraction, respectively, of the hopper interior volume;
    means for laterally supporting said wall, the supporting means cooperating with said carrier means;
    said wall comprising planking affixed to the supporting means, said planking comprising substantially vertical planks running parallel to one another, said planks fittingly joined together by rabbet sections to form said cylindrical jacket, each of said rabbet sections comprising a tongue and groove joint movable with respect to each other during lateral movement of said wall, each of said rabbet sections further comprising a free tongue side having a recess therein which faces the interior of the skeleton structure;
    suspension members each having an upper end pivotably connected to said carrier means and each having a lower end rigidly connected to said supporting means so that pivotable movement of a suspension member about the upper end affords lateral movement of the lower end with respect to the upper end, the pivotable movement of each of said suspension members affording said lateral movement of said wall.

* * * * *